(12) United States Patent  
Caird et al.

(10) Patent No.: US 8,787,147 B2
(45) Date of Patent: Jul. 22, 2014

(54) TEN GIGABIT ETHERNET PORT PROTECTION SYSTEMS AND METHODS

(75) Inventors: Ross Caird, Ottawa (CA); Michael Watford, Ottawa (CA); Onder Yazar, Ottawa (CA); Marc Holness, Nepean (CA)

(73) Assignee: Ciena Corporation, Hanover, MD (US)

( * ) Notice: Subject to any disclaimer, the term of this patent is extended or adjusted under 35 U.S.C. 154(b) by 415 days.

(21) Appl. No.: 12/907,165

(22) Filed: Oct. 19, 2010

(65) Prior Publication Data

US 2012/0092985 A1    Apr. 19, 2012

(51) Int. Cl.
*H04L 12/437* (2006.01)

(52) U.S. Cl.
USPC ........................................................ 370/216

(58) Field of Classification Search
USPC .................. 370/219, 220, 221, 222, 223, 224, 370/216–218
See application file for complete search history.

(56) References Cited

U.S. PATENT DOCUMENTS

| | | | | |
|---|---|---|---|---|
| 5,069,521 | A * | 12/1991 | Hardwick | 385/24 |
| 5,793,745 | A * | 8/1998 | Manchester | 370/224 |
| 6,879,558 | B1 * | 4/2005 | Honda et al. | 370/222 |
| 8,199,636 | B1 * | 6/2012 | Rouyer et al. | 370/218 |
| 8,199,639 | B2 * | 6/2012 | Doukai et al. | 370/228 |
| 8,284,656 | B2 * | 10/2012 | Saha et al. | 370/219 |
| 8,325,611 | B2 * | 12/2012 | Friskney et al. | 370/236.2 |
| 2005/0099951 | A1 * | 5/2005 | Mohan et al. | 370/241 |
| 2009/0168647 | A1 * | 7/2009 | Holness et al. | 370/228 |
| 2009/0168671 | A1 * | 7/2009 | Holness et al. | 370/256 |
| 2010/0165883 | A1 * | 7/2010 | Holness et al. | 370/255 |

* cited by examiner

*Primary Examiner* — Chandrahas Patel
*Assistant Examiner* — Lan Huong Truong
(74) *Attorney, Agent, or Firm* — Clements Bernard PLLC; Christopher L. Bernard; Lawrence A. Baratta, Jr.

(57) ABSTRACT

The present disclosure provides protection systems and methods for Ethernet ports. In particular, the present invention may provide a form of facility protection for any two facilities, located on any two cards. The facilities are provisioned as a protected pair and using automatic ITU-T Y.1731 control frames for control. In an exemplary embodiment, provisioning includes creation of an L2 protection service and associating it to a pair of facilities. One facility is identified as a working facility and the other as a protection facility. Under normal conditions (i.e., no facility fault), the working facility is in an active state and not conditioning while the protection facility is in a standby state and transmitting conditioning to subtending equipment. If a facility fault is detected at the working facility, then the working facility transmits condition Remote Fault (RF) and the protection facility removes it's transmit conditioning and becomes the active facility.

17 Claims, 14 Drawing Sheets

TEN GIGABIT ETHERNET PORT PROTECTION SYSTEMS AND METHODS

FIELD OF THE INVENTION

The present invention relates generally to Ethernet networking, and more particularly, the present invention relates to protection systems and methods for Ethernet ports, such as 10 Gigabit Ethernet Local Area Network (10 GELAN) ports using a combination of Link State Signaling and Operations, Administration, and Maintenance (OAM) Functions and Mechanisms.

BACKGROUND OF THE INVENTION

Ethernet services are proliferating in networks. Service providers and end-users are deploying and using Ethernet services such as Gigabit Ethernet, 10 Gigabit Ethernet Local Area Network (10 GELAN), and the like. These Ethernet services may require protection at the Ethernet port level. With reference to 10 GELAN, a possible method for protected handoff of two 10 GELAN ports would be to "handoff" a pair of ports which were members of a Link Aggregation Group (LAG) and use Link Aggregation Control Protocol (LACP) in order to effectively indicate link state by managing the ports within the LAG group and their interconnection with subtending equipment. This is possible to do on a single circuit pack but challenging to accomplish across multiple circuit packs especially if they are not co-located. It also may not be possible depending on the capabilities of the hardware (specifically the Ethernet switches involved). This also requires LACP protocol support on subtending equipment. In addition, multiple circuit pack solutions using LAG also requires no intermediate circuit packs terminate at layer two. LAG with LACP may be used with two ports on different circuit packs in the same location or in a different location but the complexity involved in the configuration and management of these "protected ports" increases substantially and depending on the Ethernet Switches involved may not be possible at all.

BRIEF SUMMARY OF THE INVENTION

In an exemplary embodiment, a method includes operating an Ethernet local area network service over a plurality of network elements; providing a pair of Ethernet facilities to subtending equipment, the pair of Ethernet facilities includes a working facility and a protection facility; forwarding traffic over the working facility thereby using the working facility as active; conditioning the protection facility thereby using the protection facility as standby; and responsive to detecting a fault on the working facility, forwarding traffic over the protection facility. The method further includes signaling status between the pair of Ethernet facilities using ITU Y.1731 control frames. The method may further include, responsive to detecting the fault, transmitting Alarm Indication Signal frames between the plurality of network elements; and periodically retransmitting the Alarm Indication Signal frames between the plurality of network elements while the fault remains. The method may further include, responsive to detecting the fault, removing the conditioning from the protection facility thereby using the protection facility as active; and, responsive to detecting the fault, conditioning the working facility thereby using the working facility as standby. Conditioning includes transmitting a condition Remote Fault. The method may further include flushing forwarding databases on the plurality of network elements to relearn and reestablishing media access control forwarding over the protection facility. The method may further include utilizing Continuity Check Messages between the plurality of network elements and the subtending equipment to detect the fault; responsive to detecting the fault, removing the conditioning from the protection facility thereby using the protection facility as active and conditioning the working facility thereby using the working facility as standby; and responsive to detecting the fault, transmitting a Ring—Automatic Protection Switching message between the plurality of network elements and the subtending equipment to require a flush of forwarding databases such that traffic is relearned on the protection facility.

Optionally, the providing a pair of Ethernet facilities to subtending equipment is performed by a single layer two device. The subtending equipment may include a first layer two device receiving the working facility and a second layer two device receiving the protection facility. The subtending equipment and the single layer two device may have one or more layer two terminating devices disposed intermediately between them, the one or more layer two terminating devices are configured with port state mirroring enable for link state forwarding. Alternatively, the providing a pair of Ethernet facilities to subtending equipment is performed by a first layer two device providing the working facility and a second layer two device providing the protection facility. The subtending equipment may include a first layer two device receiving the working facility and a second layer two device receiving the protection facility. The subtending equipment and the first layer two device and the subtending equipment and the second layer two device may have one or more layer two terminating devices disposed intermediately between them, the one or more layer two terminating devices are configured with port state mirroring enable for link state forwarding. The subtending equipment does not support Link Aggregation Control Protocol.

In another exemplary embodiment, a network includes a plurality of interconnected layer two network elements forwarding packets therebetween; an Ethernet local area network service on the plurality of interconnected layer two network elements; and a protected pair of ports including a working facility and a protection facility, wherein the protected pair of ports providing the Ethernet local area network service to subtending equipment, wherein the protection facility transmits a condition Remote Fault; wherein Continuity Check Messages are exchanged between the plurality of layer two network elements and the subtending equipment to detect a fault on the working port, and upon detection of the fault, the protection facility removes the condition Remote Fault and Ring—Automatic Protection Switching messages are exchanged between the plurality of network elements to require a flush of forwarding databases such that traffic is relearned on the protection facility. Optionally, the protected pair of ports to subtending equipment is performed by a single layer two network element. The subtending equipment may include a first layer two device receiving the working facility and a second layer two device receiving the protection facility. The protected pair of ports to subtending equipment may be performed by a first layer two device providing the working facility and a second layer two device providing the protection facility. The protected pair of ports to subtending equipment may include a first layer two network element receiving the working facility and a second layer two network element receiving the protection facility.

In yet another exemplary embodiment, a method includes provisioning a working facility for a layer two service between a first set of equipment and a second set of equipment; provisioning a protection facility for the layer two service between the first set of equipment and the second set of equipment; forwarding traffic over the working facility; transmitting a condition Remote Fault over the protection facility; utilizing Continuity Check Messages to detect a fault; responsive to detecting the fault, removing the condition Remote Fault from the protection facility and transmitting a condition Remote Fault the working facility; and responsive to detecting the fault, transmitting a Ring—Automatic Protection Switching message to require a flush of forwarding databases such that traffic is relearned on the protection facility.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides protection systems and methods for Ethernet ports. In particular, the present invention may provide a form of non-revertive or revertive facility protection for any two facilities, located on any two cards. The facilities are provisioned as a protected pair and using automatic ITU-T Y.1731 control frames for control. This protection mode operates on facilities configured as interface types External Network to Network Interface (E-NNI) or User Network Interface (UNI) and Ethernet Local Area Network (ELAN) services. In an exemplary embodiment, provisioning includes creation of an L2 protection service and associating it to a pair of facilities. One facility is identified as a working facility and the other as a protection facility. Under normal conditions (i.e., no SFP facility fault), the working facility is in an active state and not conditioning while the protection facility is in a standby state and transmitting conditioning to subtending equipment (with Remote Fault or Laser Off). If a facility fault is detected at the working facility, then the working facility transmits condition Remote Fault (RF) and the protection facility removes it's transmit conditioning and becomes the active facility. Advantageously, the present invention provides simplicity of implementation and provisioning, requires no LACP compliant subtending equipment, allows for protected ports to be co-located or located at a distance, provides fast protection switch times (e.g., ~50 ms), and allows for intermediate layer two terminating equipment.

Figure 1:
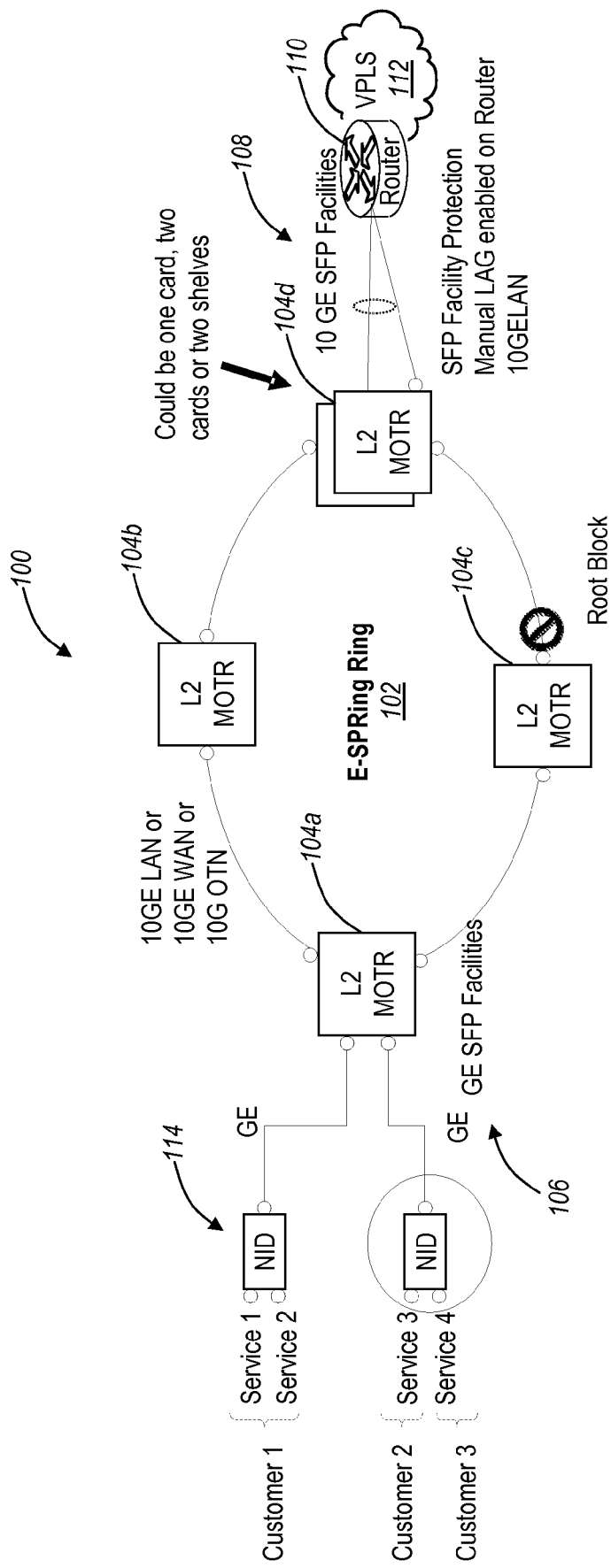
FIG. 1 is a network diagram of a 10 Gigabit Ethernet (10 GE) facility protection mechanism.

Referring to FIG. 1, in an exemplary embodiment, a network 100 illustrates 10 GE facility protection. Specifically, the network 100 includes an Ethernet Shared Protection Ring (E-SPRing) 102 of four nodes 104a, 104b, 104c, 104d. The nodes 104 may include optical network elements (NEs) providing dense wave division multiplexed (DWDM) line outputs and the like at 10 G, 40 G, 100 G, etc. In an exemplary embodiment, the nodes 104 include various line cards or circuit packs including a L2 muxponder (MOTR). The L2 MOTR line card may use SFP interfaces to aggregate up to 12 Ethernet client signals (independently configurable as 100 Mbps, 1 Gbps or 10 Gbps) into an Optical Transport Network (OTN) or an Ethernet line signal. Alternatively, the L2 MOTR may use SONET/SDH as well. Furthermore, the present invention may also be used with electrical interfaces as well as optical interfaces (e.g., SFP). The L2 MOTR line card provides Ethernet aggregation and switching capabilities and the line side offers two pluggable 10-Gbps interfaces which support multiple encapsulation formats. The L2 MOTR circuit packs may provide support for Ethernet shared protection ring (E-SPRing) based on ITU-T G.8032, which defines an automatic protection switching (APS) protocol and protection switching mechanism for native Ethernet layer ring topologies. This protection mechanism can support the well established 802.1 Bridging and 802.3 MAC standards, and utilize the 802.1ag Ethernet OAM standard to provide management control over the ring. The L2 MOTR is an exemplary line card, and those of ordinary skill in the art will recognize any layer two (L2) capable module may use the systems and methods described herein.

In the example of FIG. 1, the network 100 includes an E-LAN service between the nodes 104a, 104d provisioned on two GE SFP facilities 106 and two LOGE SFP facilities 108. The LOGE SFP facilities 108 are operating in the SFP facility protection mode of the present invention. Specifically, the E-LAN service provides the GE SFP facilities 106 to the LOGE SFP facilities 108 with the LOGE SFP facilities 108 providing SFP facility protection to a router 110 which may connect to a Virtual private LAN service (VPLS) 112 or the like. The E-SPRing 102 may include 10 GELAN, 10 GEWAN, OTN, SONET/SDH, etc. between the nodes 104. The GE SFP facilities 106 are provided to the node 104a from various end-users (labeled as customers 1, 2, 3 and services 1, 2, 3, 4). Note the present invention contemplates the facility protection on a handoff to the router 110 and can be a single E-LAN from one end-user or an aggregation of a plurality of end-users. As described herein, SFP is an optical interface, and those of ordinary skill in the art will recognize the present invention contemplates use with other interfaces such as electrical interfaces and other optical interfaces besides SFP. The customers 1, 2, 3 and services 1, 2, 3, 4 provide the SFP facilities 106 via Network Interface Devices (NIDs) 114 that are communicatively coupled to the node 104a. The NIDs 114 add a provider tag with a Virtual LAN ID (VID) equivalent to L2 E-LAN Service. This allows the Provider VID to be handed off to the VPLS 112 network (E-NNI at 10 GE SFP Facility). The NIDs 114 may provide OAM capabilities such as IEEE 802.1ag Continuity Check Messages (CCM), Loopback Messages (LBM), Linktrace Messages (LTM), and the like. Further, the NIDs 114 may require "Port State Mirroring" provisioned. Furthermore, the network 100 may uses OAM capabilities of IEEE 802.1ag The present invention utilizes some of the functions and mechanisms defined in ITU-T Y.1731 in order to create a new form of protection group. ITU-T Recommendation Y.1731 "OAM functions and mechanisms for Ethernet based networks" (2006) provides functions and mechanisms for Ethernet networks which can be used to indicate status and manage individual ports at a given Maintenance Entity Level but does not extend the application of these mechanisms to groups of ports for the purpose of forming "protection groups". The present invention also uses the "Link Fault Signaling" mechanism inherent in the IEEE 802.3ae instead of LACP in order to indicate status and manage individual ports through a state machine. IEEE 802.3ae defines lOGE and includes various standards including IEEE 802.3ae-2002, IEEE 802.3-2005, and IEEE 802.3-2008. Furthermore, the present invention initiates Forwarding Database (FDB) flush messages through Ring—Automatic Protection Switching (R-APS) "event" messages (which are R-APS messages with Request/State=1110) transmitted using sub-code field with value "0000" and with status field with value "00000000" in order to cause Ethernet switches in the network to flush their FDBs and re-learn the path to the newly active port. R-APS messages are protocol messages defined in Y.1731 and G.8032 "Ethernet ring protection switching." Note, the FDB flush is not a global forwarding database flush. It involves only the protected services, i.e. remaining services on the system or other protected services belonging to other protection instances remain intact in terms of their FDB entries on the network nodes. This avoids unnecessary flooding and relearning throughout the network. The list of affected services is carried efficiently in the 4096 bit service bitmap type-length-value (TLV) of the R-APS signal.

The present invention provides a form of facility protection on the 10 GE SFP facilities 108. Particularly, the protection of the LOGE SFP facilities 108 may be achieved for any two 10 GE LAN facilities, located on the same circuit pack or on two circuit packs, by provisioning them as a protected pair and using automatic Y.1731 control frames for indicating status and driving state machine behavior. The state machine ensures that only one port is active at any time (with the other port will be conditioning Remote Fault). By having the standby port condition Remote Fault, silent failures are avoided on the standby link. As described herein, conditioning refers to transmitting a condition Remote Fault such that the standby port is provisioned, ready to switch to active, and no silent failures could occur. Of note, the present invention does not assume or rely on the fact that any protocol (i.e. Virtual Router Redundancy Protocol (VRRP), Border Gateway Protocol (BGP), Open Shortest Path First (OSPF), etc.) is in operation on the subtending equipment, in order trigger a "failover" to the active data link. To provision the LOGE SFP Facilities 108, an L2 Protection "Service" is created and this service is associated to a pair of facilities. One Facility is identified as the "Working" Facility and the other as the "Protection" Facility. Initially, the "Working" Facility is in an Active state and not conditioning while the "Protection" Facility is in a Standby state transmitting conditioning the subtending equipment (Remote Fault or optionally Laser Off) . If a Facility Fault is detected at the "Working" Facility then the "Working Facility" transmits a condition (RF or Laser Off) and the Protection Facility removes its conditioning and become the "Active" Facility.

Referring to FIGS. 2-6, in an exemplary embodiment, an example operation of LOGE client facility protection is illustrated in a network 200. The network 200 is illustrated with four network elements 202 labeled as NE#1, NE#2, NE#3, and NE#4. The network elements 202 may include any type of network element including, but not limited to, switches, routers, optical switches, optical cross-connects, multi-service provisioning platforms, and the like. In particular, the network elements 202 utilize IEEE 802.1Q VLAN Tagging and an E-LAN service 204 is provisioned on the network elements 202 and handed off to a router 210. The network 200 is described herein to illustrate 10 GE client facility protection on a 10 GE UNI facility 220 to the router 210 from the NE#2 and the NE#3. For illustration purposes, the network 200 is shown emphasizing activity at the network elements 202, and those of ordinary skill in the art will recognize that the network 200 may include other elements and the like which are omitted for simplicity. Furthermore, for purposes of illustration, the network 200 is illustrated with various UNI and NNI ports labeled as p1, p2, p3, p4, p5 on each of the network elements 202. Also, FIGS. 2-6 each represent the network 200 at different points in time to illustrate 10 GE client facility protection of the present invention.

Figure 2:
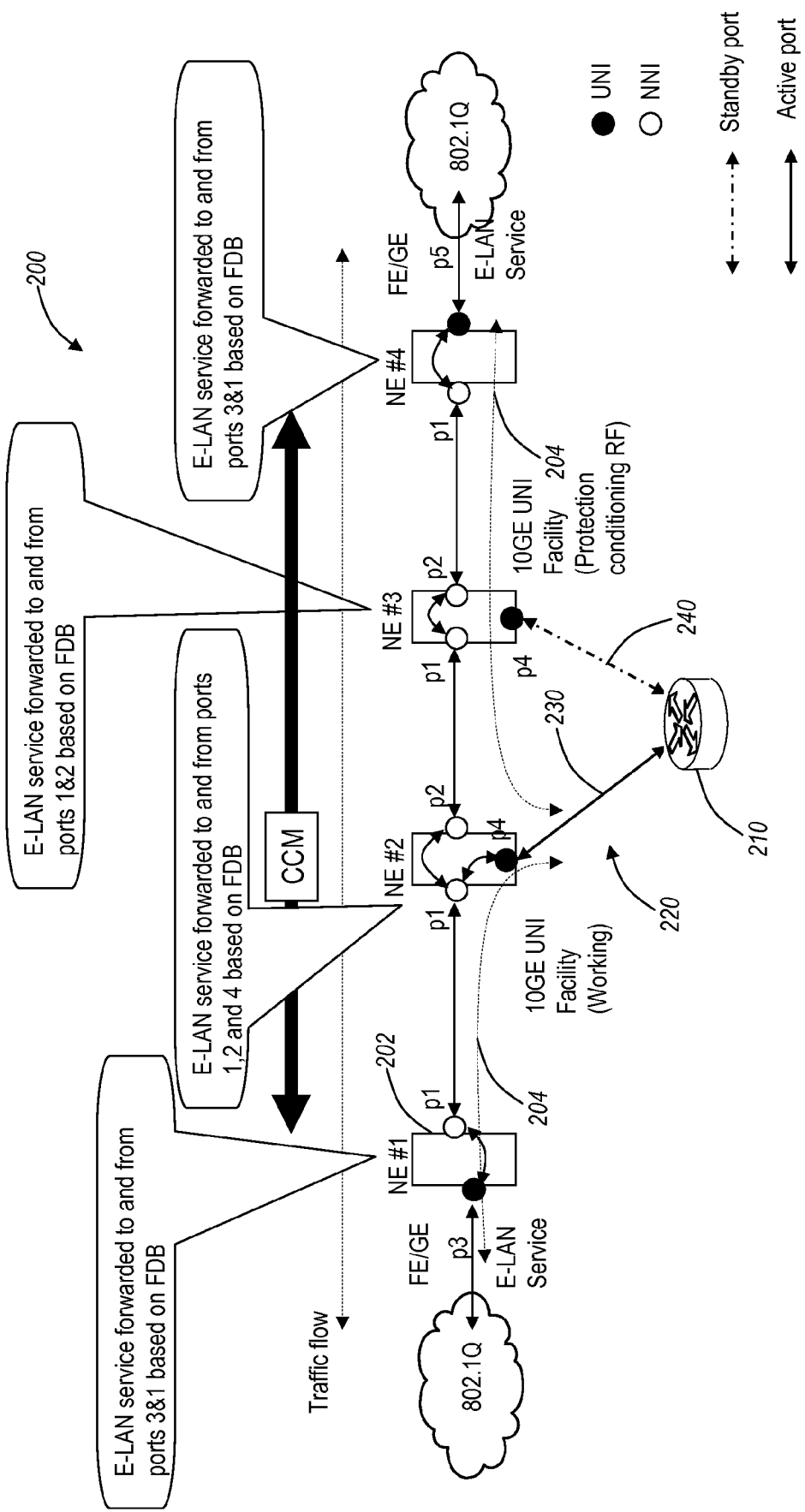
FIG. 2 is a network diagram of an example operation of LOGE client facility protection showing a network in an initial state.

FIG. 2 illustrates the network 200 in an initial state. In particular, the 10 GE UNI facility 220 to the router 210 includes a working facility 230 from p4 of NE#2 to the router 210 and a protection facility 240 from p4 of NE#3 to the router 210. The protection facility 240 is transmitting conditioning Remote Fault and is the standby port while the working facility 230 is the active port. In the network 200, traffic flows linearly between the network elements 202, i.e. from NE#1 to NE#2 to NE#3 to NE#4 and in the opposite direction. CCMs are also transmitted therebetween the network elements 202. At the NE#1, the E-LAN service 204 is forwarded to and from ports p1 and p3 based on the FDB, and port p3 in a UNI port and port p1 is an NNI port. Similarly at NE#4, the E-LAN service 204 is forwarded to and from ports p1 and p5 based on the FDB, and port p5 in a UNI port and port p1 is an NNI port. At the NE#2, the E-LAN service 204 is forwarded to and from ports p1, p2, and p4 based on the FDB, and ports p1 and p2 are NNI ports and port p4 is an NNI port. In particular, the port p4 on NE#2 provides the working facility 230. At the NE#3, the E-LAN service 204 is forwarded to and from ports p1 and p2 based on the FDB, and ports p1 and p2 are both NNI ports. The NE#3 includes a port p4 which is not receiving forwarded packets, but rather is set to conditioning RF, i.e. the port p4 provides the protection facility 240.

Figure 3:
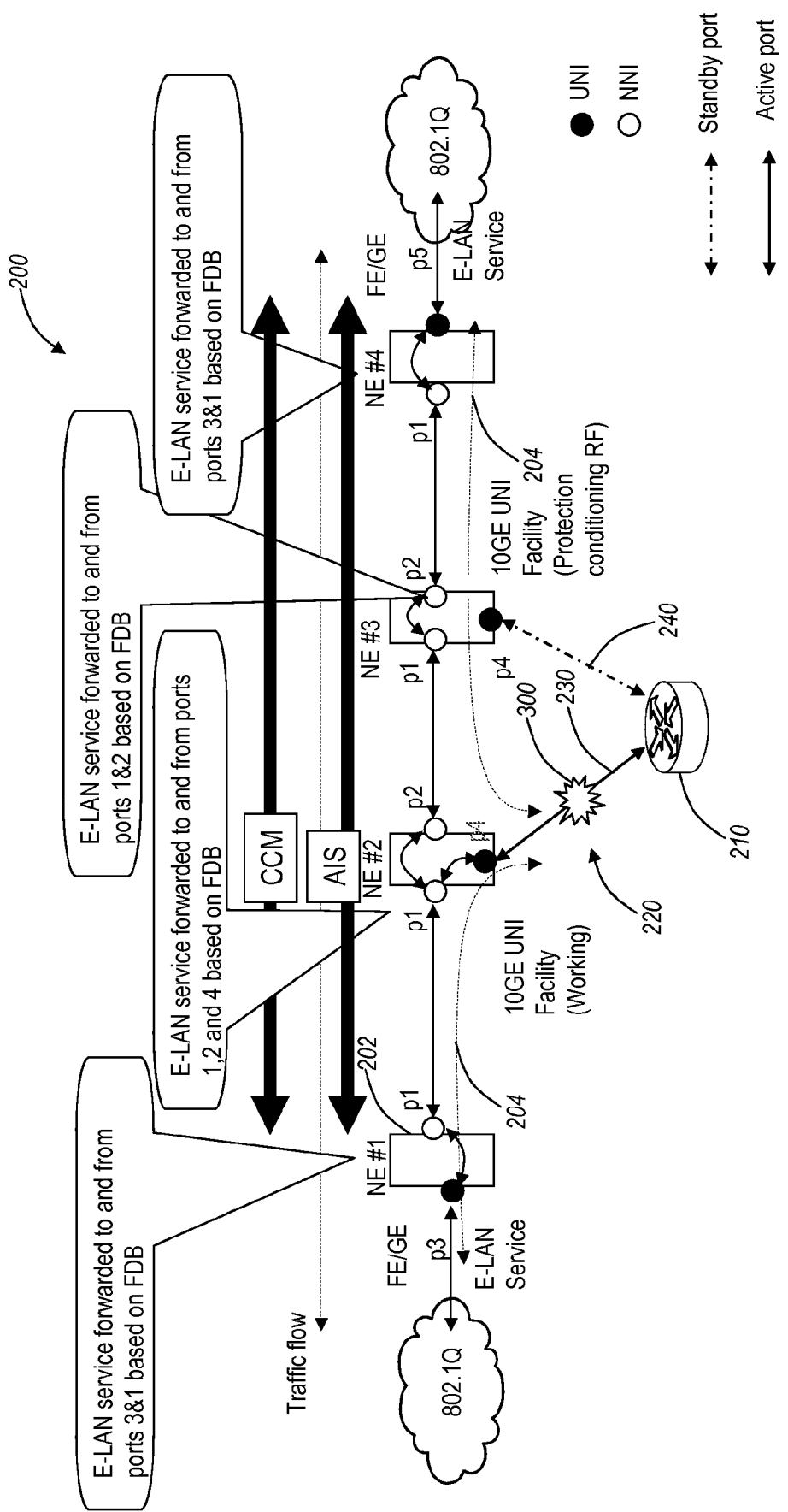
FIG. 3 is a network diagram of the example operation after the initial state of FIG. 2 and with a client failure detected on a working facility.
Figure 4:
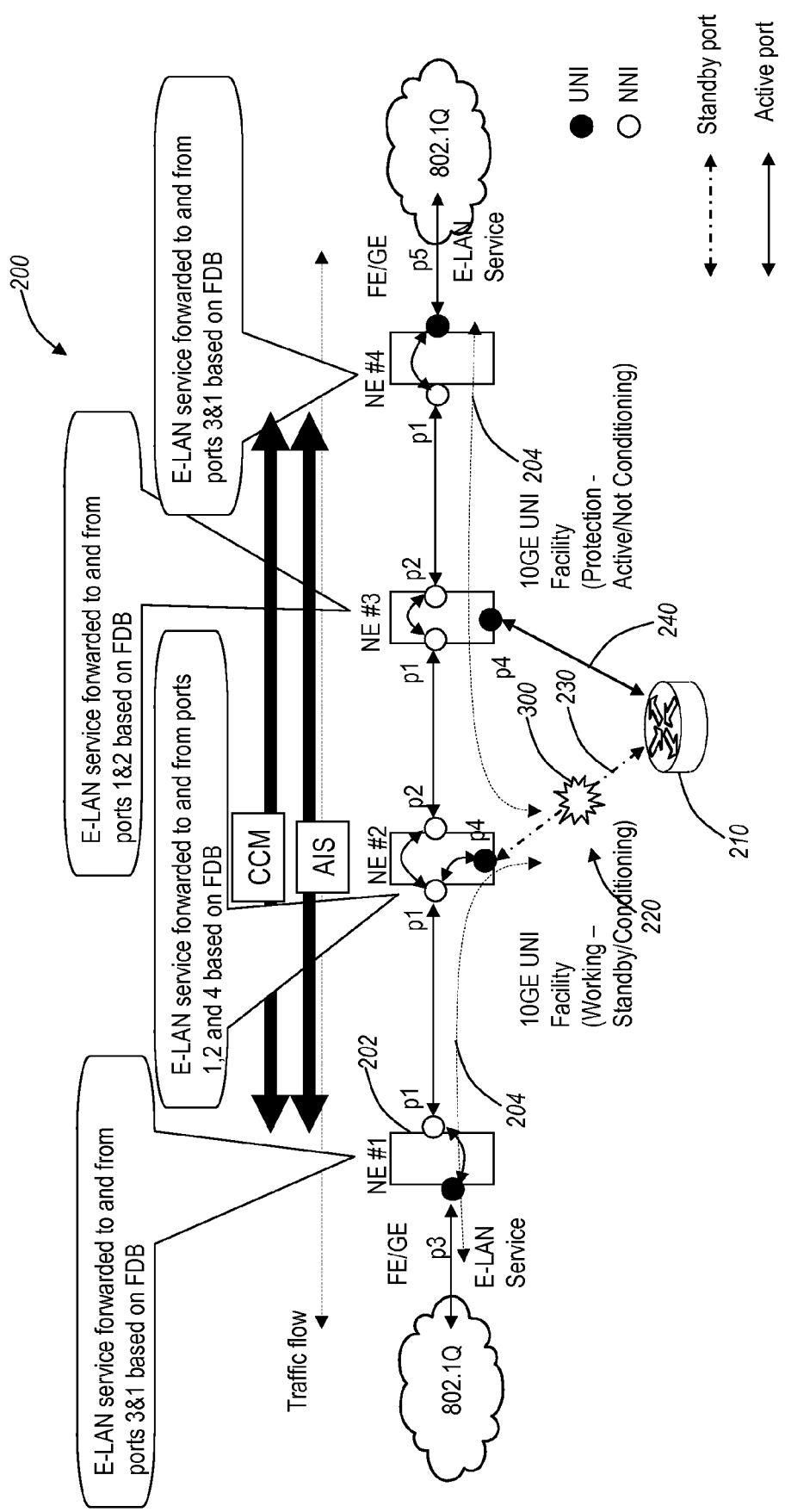
FIG. 4 is a network diagram of the example operation after the client failure of FIG. 3 with the working facility becoming standby and a protection facility becoming active.

FIG. 3 illustrates the network 200 after the initial state and with a client failure 300 detected on the working facility 230 on port p4 of NE #2. Here, the port forwarding on each of the network elements 202 is the same as in FIG. 2. However, because of the failure 300, Y.1731 Alarm Indication Signal (AIS) frames are transmitted between the network elements 202. The AIS fames are transmitted by and between the network elements 202 on either side of the failure 300 towards service endpoints. The AIS frames are sent periodically while the failure 300 remains. Based on the failure 300, the port p4 on the NE#2 does not send data to the router 210. FIG. 4 illustrates the network 200 after the client failure with the working facility 230 on port p4 of NE#2 becoming standby and the protection facility 240 on port p4 of NE#3 becoming active, i.e. a switch of designations of active and standby for the lOGE UNI facility 220. Similar to FIG. 3, the port forwarding on each of the network elements 202 in FIG. 4 is the same as in FIGS. 2 and 3. However, in FIG. 4, the port p4 on NE#3 removes the conditioning and becomes active to the router 210 while concurrently, the port p4 on NE#2 begins conditioning and becomes standby to the router 210.

Figure 5:
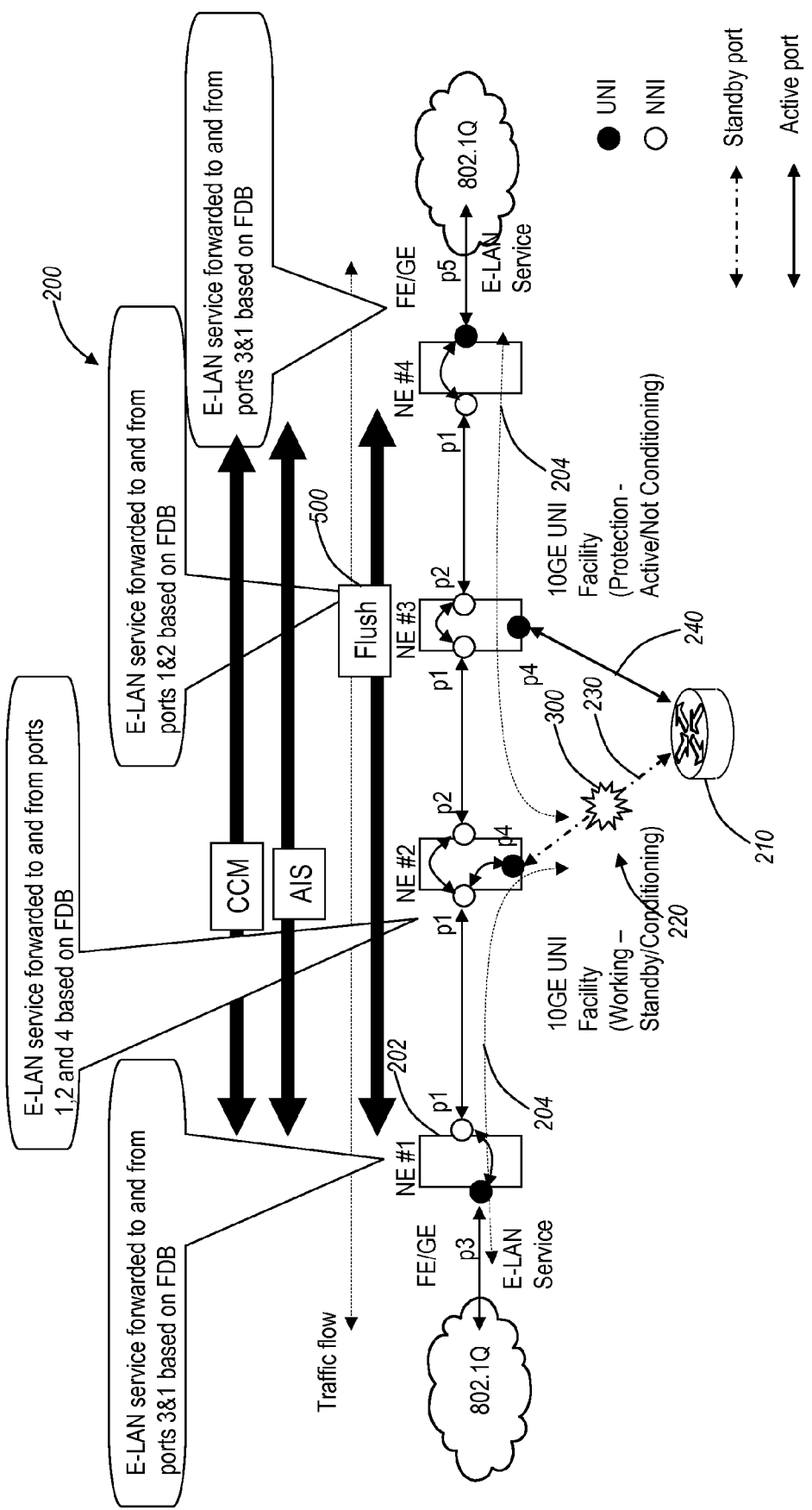
FIG. 5 is a network diagram of the example operation after the switch of designations for the working and protection facilities with subsequent flush messages exchanged in the network.
Figure 6:
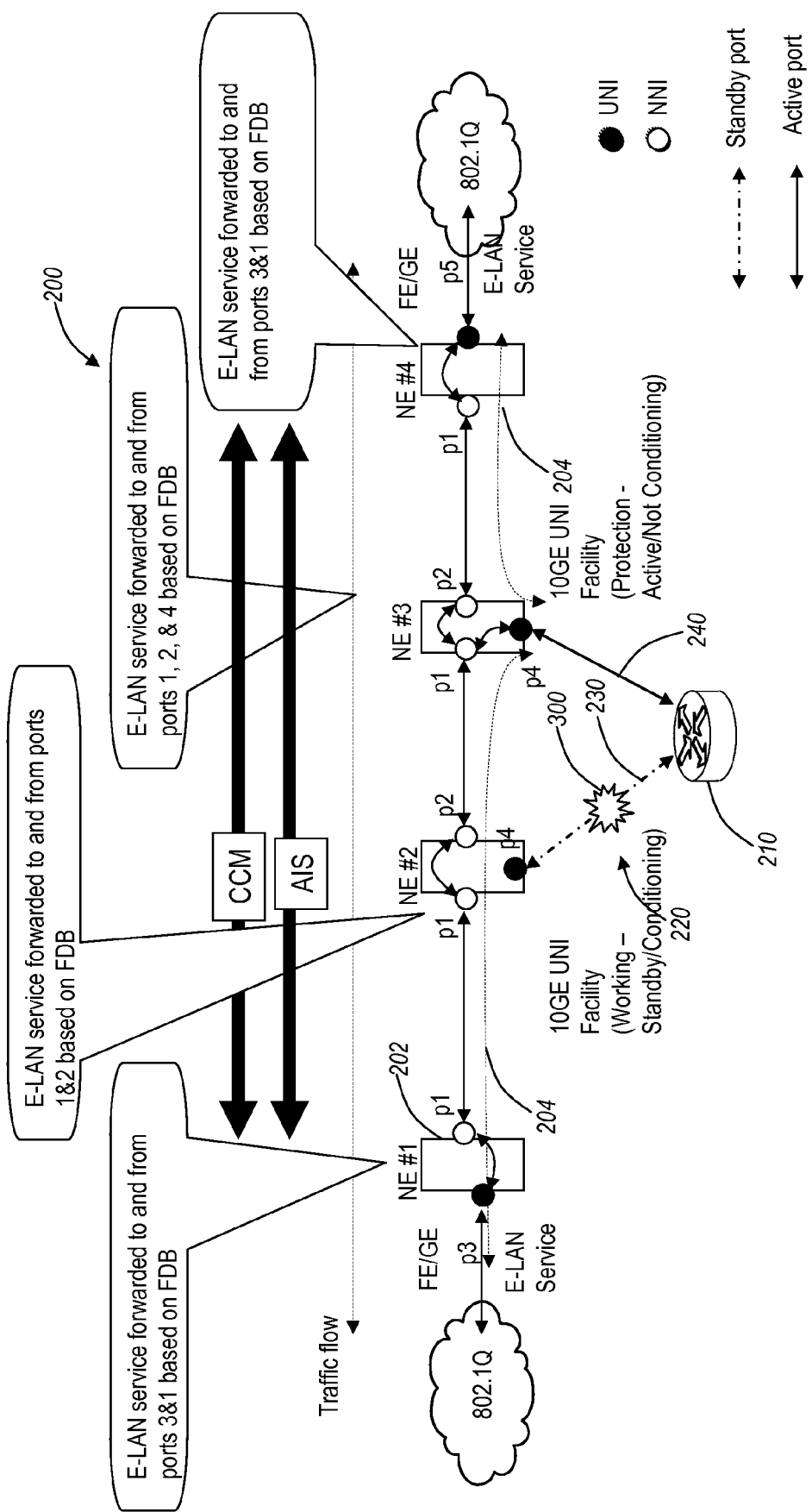
FIG. 6 is a network diagram of the example operation after the flush messages and learning showing traffic restored via the protection facility.

FIG. 5 illustrates the network 200 following the switch of designations of active and standby for the LOGE UNI facility 220 in FIG. 4. Again, the port forwarding on each of the network elements 202 in FIG. 5 is the same as in FIGS. 2-4. The port p4 on NE#3 is designated as active, i.e. the protection facility 240, and the port p4 on NE#2 is designated as standby, i.e. the working facility 230, with the failure 300 still in place. Here, a flush 500 message is sent between each of the network elements 202 to all of the components in the L2 system. The flush 500 message may include a broadcast G.8032 "Flush Event" Message. The flush 500 message is configured to remove all learned Media Access Control (MAC) addresses of the ports in the network elements 202 from the FDB. As discussed above, the flush 500 message may only apply to the service affected by the failure 300, e.g. the flush 500 message may specify particular services to flush specifically the services affected by the failure 300. FIG. 6 illustrates the network 200 following the flush 500 messages and learning showing traffic restored via the protection facility 240 on port p4 of NE#3. Specifically, the flush 500 messages are a mechanism to trigger traffic flooding, and as a result, the service can be kept unbroken and a new forwarding path is set up by self-learning function thereby reestablishing MAC addresses in the FDB. At the NE#1, the E-LAN service 204 is forwarded to and from ports p1 and p3 based on the newly relearned FDB, and port p3 in a UNI port and port p1 is an NNI port. Similarly at NE#4, the E-LAN service 204 is forwarded to and from ports p1 and p5 based on the newly relearned FDB, and port p5 in a UNI port and port p1 is an NNI port. At the NE#2, the E-LAN service 204 is forwarded to and from ports p1 and p2 based on the newly relearned FDB, and ports p1 and p2 are NNI ports. At the NE#3, the E-LAN service 204 is forwarded to and from ports p1, p2, and p4 based on the newly relearned FDB, and ports p1 and p2 are NNI ports and port p4 is an NNI port. The NE#2 includes a port p4 which is not receiving forwarded packets, but rather is set to conditioning RF, i.e. the port p4 provides the working facility 230 as standby.

Referring to FIGS. 7-14, in various exemplary embodiments, differing equipment configurations are illustrated utilizing 10 GE client facility protection. As described herein, the present invention generally provides facility hand-off protection between two layer two (L2) devices. In an exemplary embodiment, one of the L2 devices may include an optical device that includes L2 functionality. Such optical devices are common in conventionally deployed metro and regional optical networking systems. These optical devices incorporate L2 functionality into layer one (L1) devices utilizing SONET, SDH, or OTN, for example. Advantageously, the systems and methods of the present invention may allow for incorporation of protected L2 client hand-offs with simple implementation and provisioning and no special requirements on subtending equipment. As may be required with optical networking systems, the present invention supports both co-located ports and ports at separate or any location and the present invention may support intermediate L2 terminal equipment as is typical in such deployments. The various FIGS. 7-14 illustrate exemplary equipment configurations for such hand-offs. Each of the exemplary equipment configurations illustrates a hand-off between a first L2 device and a second L2 device. For illustration purposes, the first L2 device is referred to herein as a L2 card, such as in an optical network, and the second L2 device is referred to as a router. Furthermore, various equipment configurations may utilize multiple L2 devices for both the first and the second L2 devices. Those of ordinary skill in the art will recognize that the use of a L2 card and router is for illustration purposes only, and the systems and methods of the present invention may be applied to other equipment. Furthermore, various interfaces are referenced in FIGS. 7-14 as SFP+ interfaces, i.e. optical interfaces, and as described herein, these are presented for illustration purposes as exemplary embodiments, and the present invention may utilized other types of interfaces.

Figure 7:
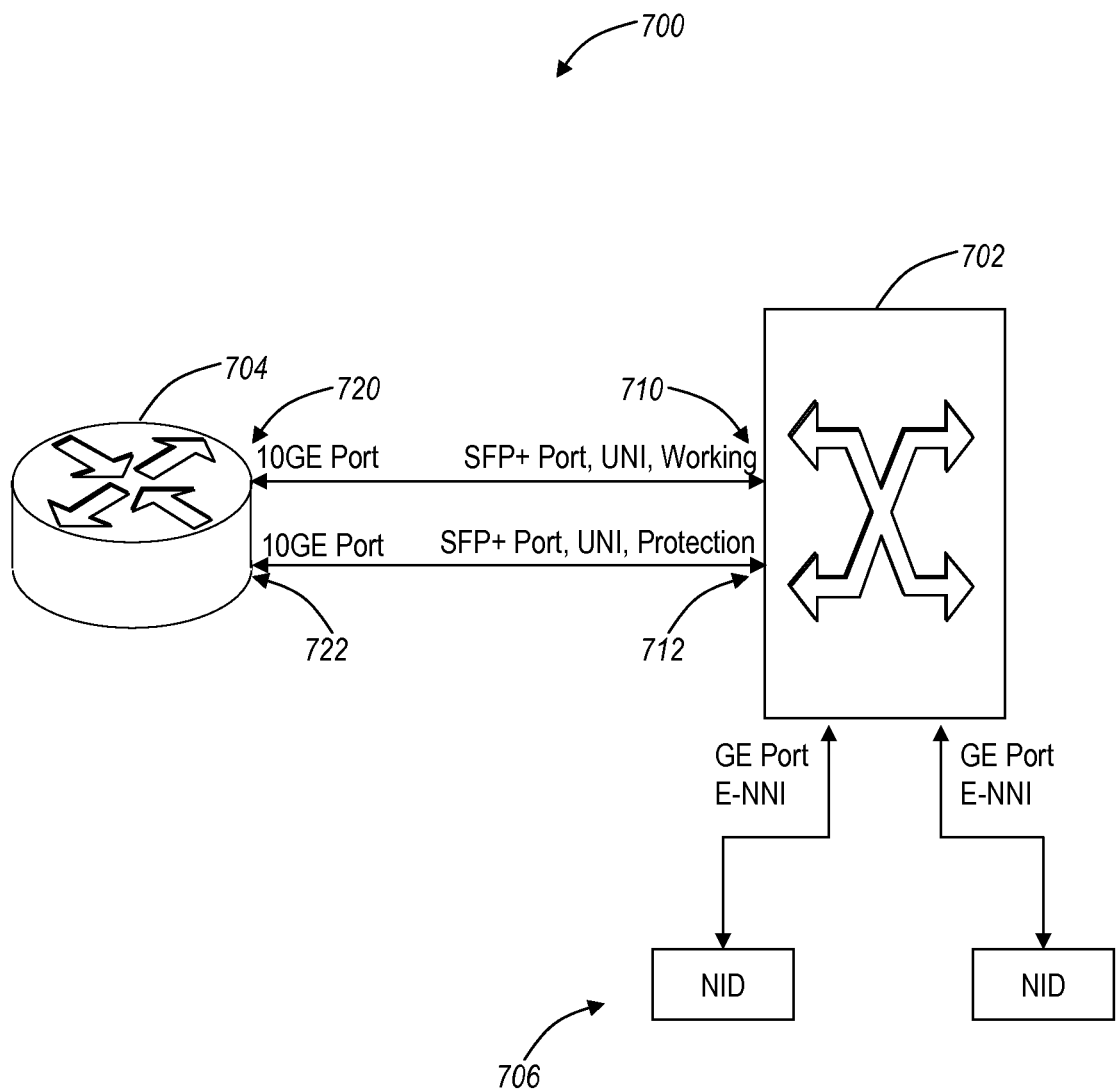
FIG. 7 is a first exemplary configuration between a L2 card and a router with both working and protection facilities on the L2 card and the router.

FIG. 7 illustrates a first configuration 700 between a L2 card 702 and a router 704 with both working and protection facilities on the L2 card 702 and the router 704. Also, the L2 card 702 is shown communicatively coupled to NIDs 706 providing GE E-NNI ports that may form an E-LAN service on the working and protection facilities. The NIDs 706 may be physically connected to the L2 card 702 or to another L2 card that is in a network with the L2 card 702. The L2 card 702 includes two SFP facilities 710, 712 that are both UNI ports, and optionally SFP+ compliant devices, with the SFP facility 710 provisioned as the working port and the SFP facility 712 provisioned as the protection port. As described herein, the facilities 710, 712 are configured to hand-off the E-LAN service to the router 704 in a protected fashion. The router 704 includes two lOGE ports 720, 722 receiving the facilities 710, 712, respectively. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one L2 E-LAN (multipoint to multipoint) provisioned thereon. Also, management traffic may be forwarded to NIDs 706 via the GE ports configured as E-NNI with a different secondary L2 E-LAN Service.

Figure 8:
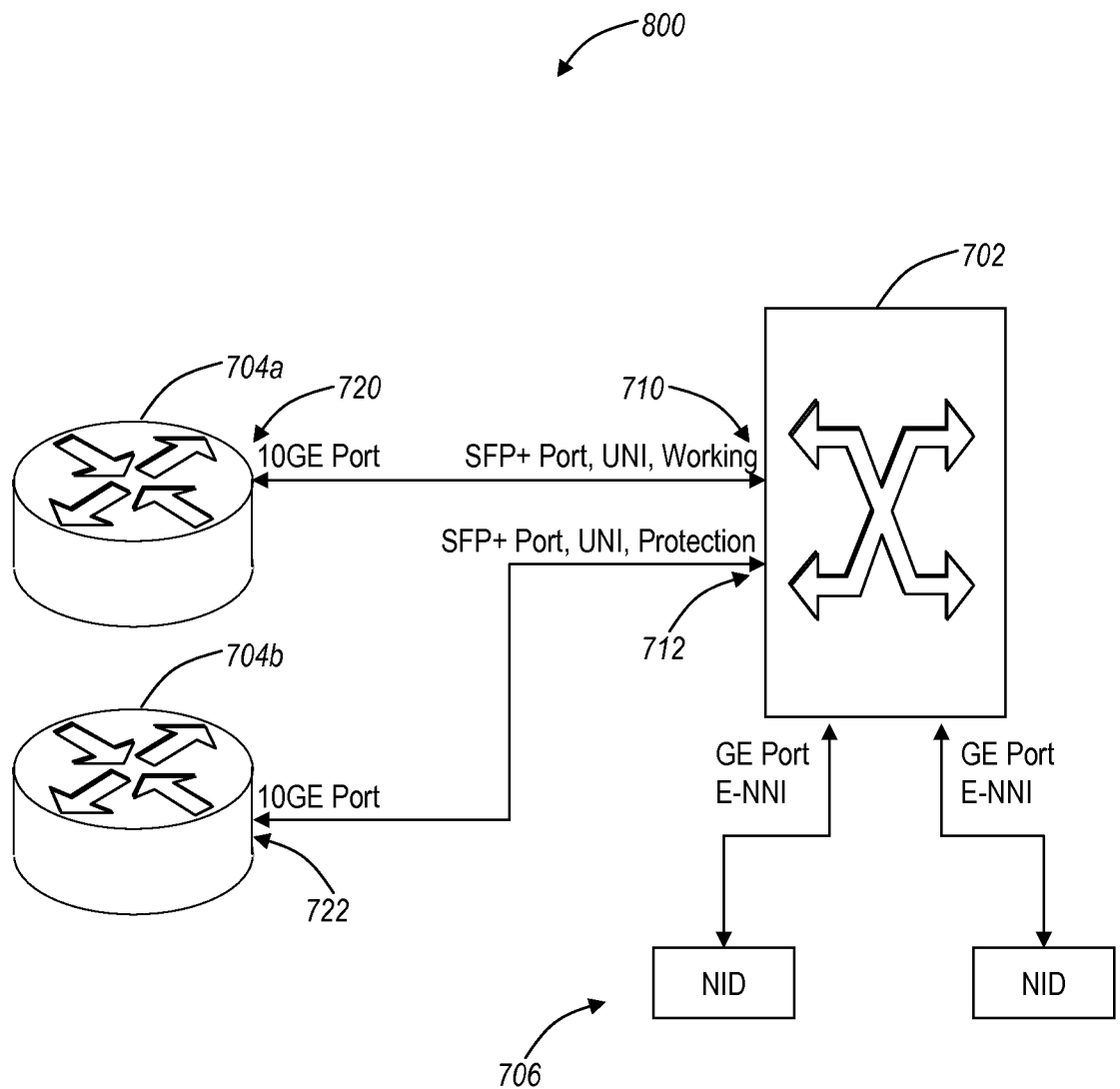
FIG. 8 is a second exemplary configuration between a L2 card and two routers with working and protection facilities on the L2 card and separate ports on the two different routers.

FIG. 8 illustrates a second configuration 800 between the L2 card 702 and two routers 704a, 704b with working and protection facilities on the L2 card 702 and separate ports on the two different routers 704a, 704b. Also, the L2 card 702 is shown communicatively coupled to NIDs 706 providing GE E-NNI ports that may form an E-LAN service on the working and protection facilities. The NIDs 706 may be physically connected to the L2 card 702 or to another L2 card that is in a network with the L2 card 702. The L2 card 702 includes two SFP facilities 710, 712 that are both UNI ports, and optionally SFP+ compliant devices, with the SFP facility 710 provisioned as the working port and the SFP facility 712 provisioned as the protection port. As described herein, the facilities 710, 712 are configured to hand-off the E-LAN service to the router 704 in a protected fashion. The second configuration 800 includes separate routers 704a, 704b which may be co-located in separate network elements or physically diverse at separate locations in separate network elements. The router 704a includes the 10 GE port 720 and the router 704b includes the lOGE port 722. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one L2 E-LAN (multipoint to multipoint) provisioned thereon. Also, management traffic may be forwarded to NIDs 706 via the GE ports configured as E-NNI with a different secondary provider tag L2 E-LAN Service (different from the data provider tag).

Figure 9:
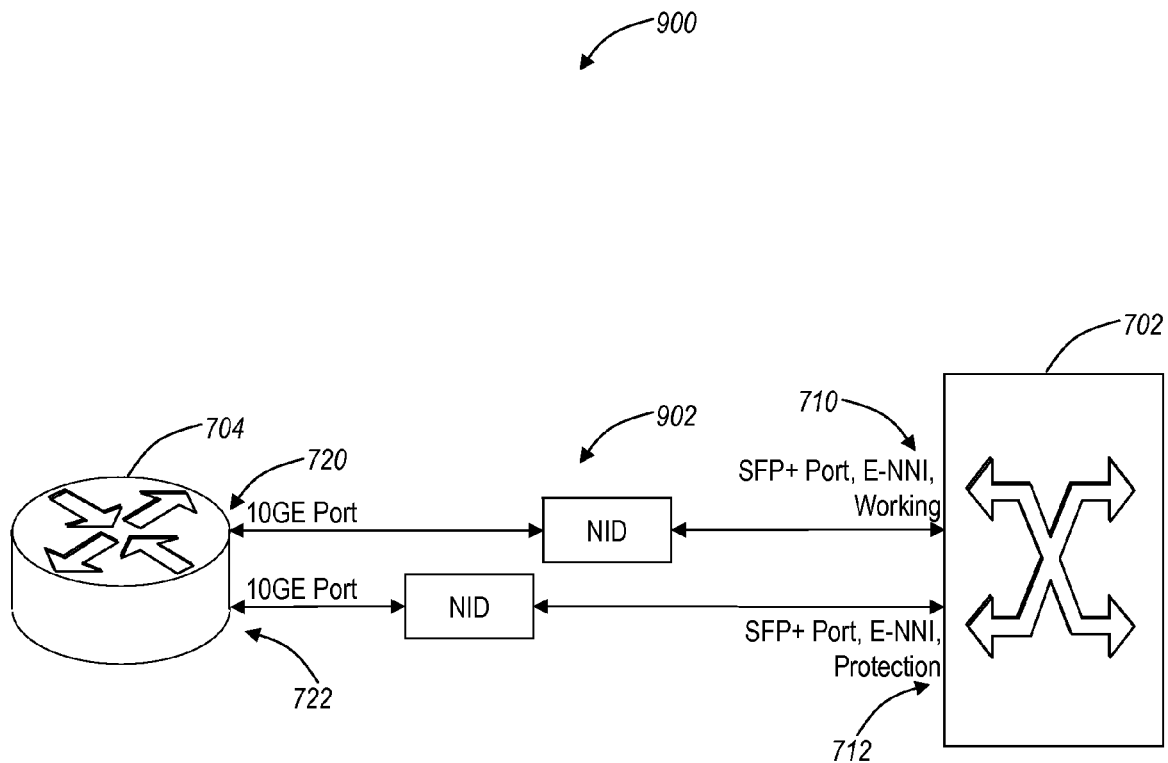
FIG. 9 is a third exemplary configuration between a L2 card and a router with both working and protection facilities on the L2 card and the router and with intermediate Network Interface Devices (NIDs) between the L2 card and the router.

FIG. 9 illustrates a third configuration 900 between the L2 card 702 and the router 704 with both working and protection facilities on the L2 card 702 and the router 704 and with intermediate NIDs 902 between the L2 card 702 and the router 704. In this configuration 900, the L2 card 702 includes two SFP facilities 710, 712 that are both E-NNI ports, and optionally SFP+ compliant devices, with the SFP facility 710 provisioned as the working port and the SFP facility 712 provisioned as the protection port. As described herein, the facilities 710, 712 are configured to hand-off an E-LAN service to the router 704 in a protected fashion. The router 704 includes two LOGE ports 720, 722 receiving the facilities 710, 712, respectively. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one L2 E-LAN (multipoint to multipoint) provisioned thereon with traffic forwarding using a Provider VID. Also, management traffic may be forwarded to the E-NNI ports with a different secondary provider tag (different from the data P-TAG). Further, the SFP facilities 710, 712 and the ports 720, 722 have NIDs 902 disposed intermediately in each path. The NIDs 902 have port state mirroring enable for link state forwarding between the SFP facilities 710, 712 and the ports 720, 722.

Figure 10:
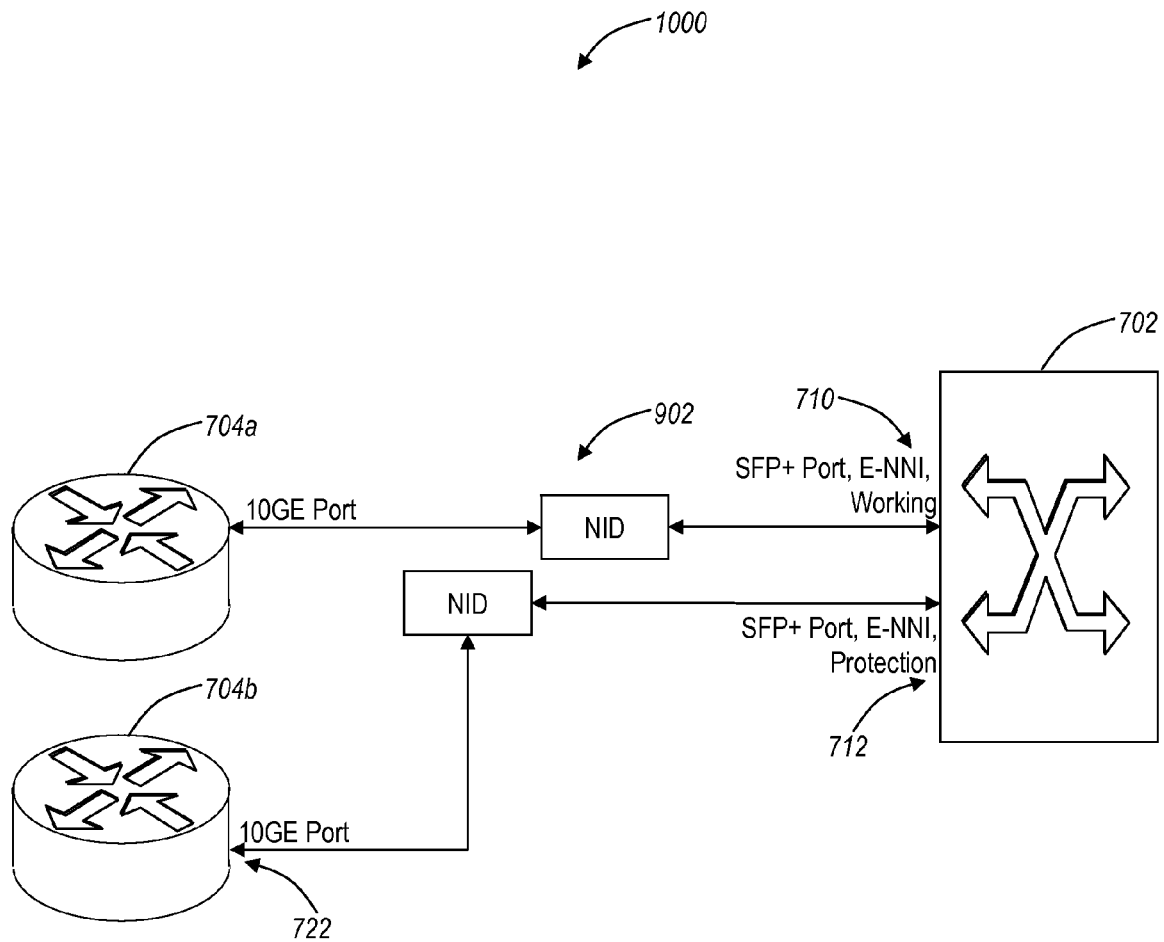
FIG. 10 is a fourth exemplary configuration between a L2 card and separate routers with working and protection facilities on the L2 card and separate ports on the two different routers and with intermediate NIDs between the L2 card and the routers.

FIG. 10 illustrates a fourth configuration 1000 between the L2 card 702 and separate routers 704a, 704b with working and protection facilities on the L2 card 702 and separate ports on the two different routers 704a, 704b and with intermediate NIDs 902 between the L2 card 702 and the routers 704a, 704b. In this configuration 1000, the L2 card 702 includes two SFP facilities 710, 712 that are both E-NNI ports, and optionally SFP+ compliant devices, with the SFP facility 710 provisioned as the working port and the SFP facility 712 provisioned as the protection port. As described herein, the facilities 710, 712 are configured to hand-off an E-LAN service to the routers 704a, 704b in a protected fashion. The router 704a includes the 10 GE port 720 and the router 704b includes the LOGE port 722 receiving the facilities 710, 712, respectively. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one or more L2 E-LAN (multipoint to multipoint) provisioned thereon with traffic forwarding using a Provider VID. Also, management traffic may be forwarded to the E-NNI ports with a different secondary provider tag (different from the data P-TAG). Further, the SFP facilities 710, 712 and the ports 720, 722 have NIDs 902 disposed intermediately in each path. The NIDs 902 have port state mirroring enable for link state forwarding between the SFP facilities 710, 712 and the ports 720, 722.

Figure 11:
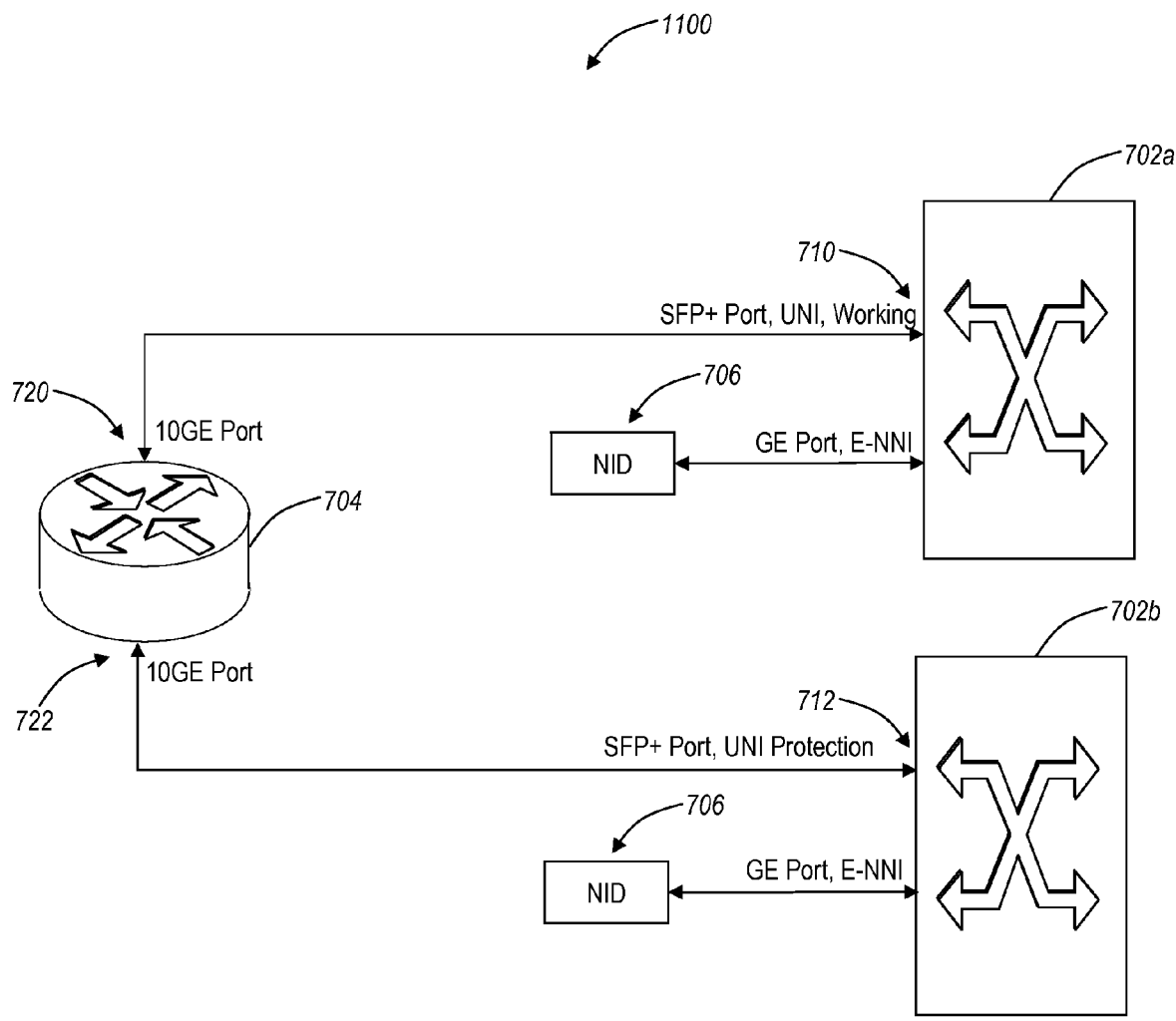
FIG. 11 is a fifth exemplary configuration between two L2 cards and a router with working and protection facilities on the separate L2 cards and on the same router.

FIG. 11 illustrates a fifth configuration 1100 between two L2 cards 702a, 702b and the router 704 with working and protection facilities on the separate L2 cards 702a, 702b and on the same router 704. Also, the L2 cards 702a, 702b are shown communicatively coupled to NIDs 706 providing GE E-NNI ports that may form an E-LAN service on the working and protection facilities. The NIDs 706 may be physically connected to the L2 cards 702a, 702b or to another L2 card that is in a network with the L2 cards 702a, 702b. The L2 card 702a includes the SFP facility 710 and the L2 card 702b includes the SFP facility 712 with both of the SFP facilities 710, 712 as UNI ports, and optionally SFP+ compliant devices. The SFP facility 710 is provisioned as the working port and the SFP facility 712 is provisioned as the protection port. As described herein, the facilities 710, 712 are configured to hand-off the E-LAN service to the router 704 in a protected fashion. The router 704 includes two LOGE ports 720, 722 receiving the facilities 710, 712, respectively. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one L2 E-LAN (multipoint to multipoint) provisioned thereon. Also, management traffic may be forwarded to NIDs 706 via the GE ports configured as E-NNI with a different secondary provider tag L2 E-LAN Service (different from the data provider tag).

Figure 12:
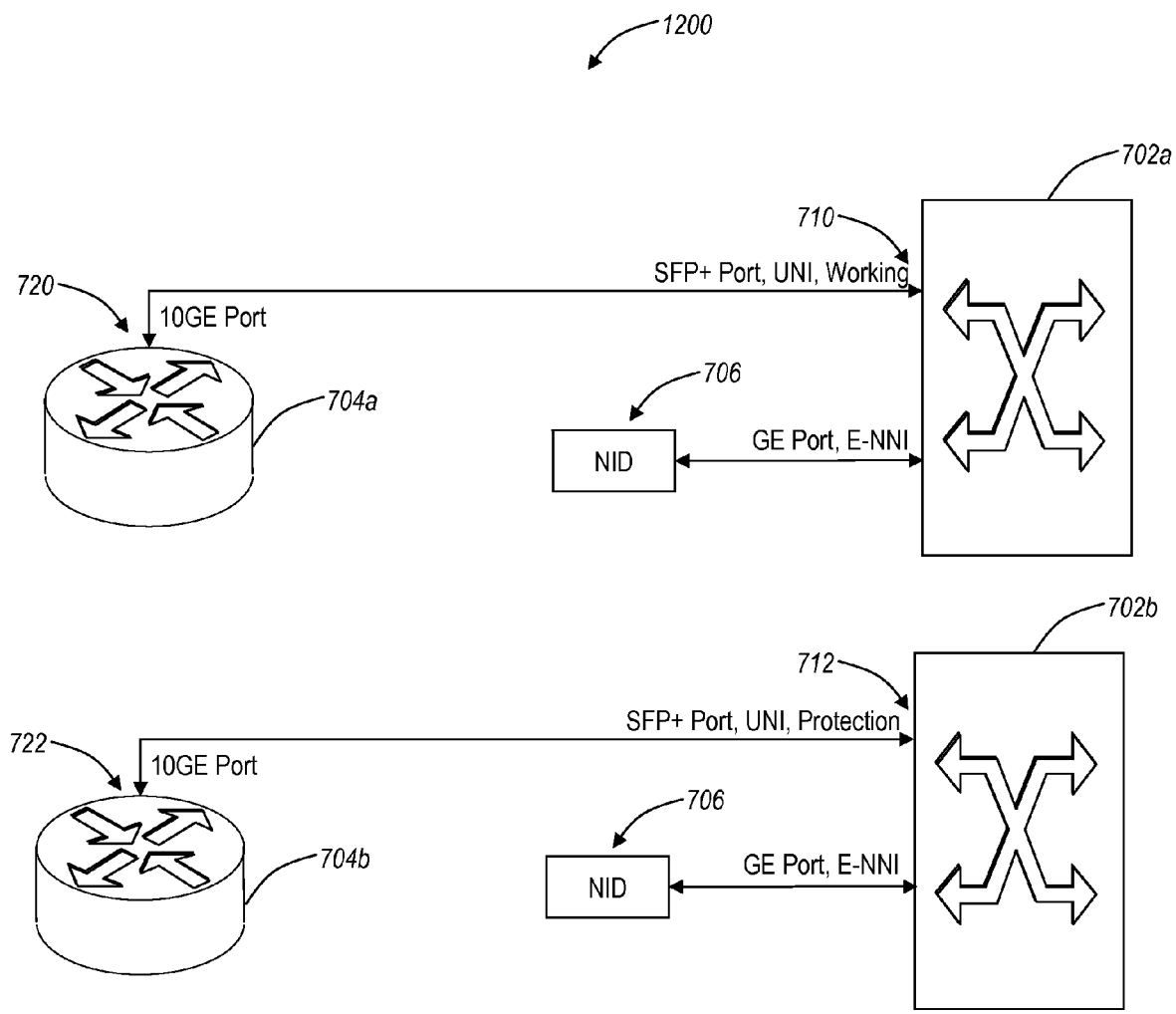
FIG. 12 is a sixth exemplary configuration between two L2 cards and between two routers with working and protection facilities on the separate L2 cards and on the separate routers.

FIG. 12 illustrates a sixth configuration 1200 between two L2 cards 702a, 702b and between two routers 704a, 704b with working and protection facilities on the separate L2 cards 702a, 702b and on the separate routers 704a, 704b. Also, the L2 cards 702a, 702b are shown communicatively coupled to NIDs 706 providing GE E-NNI ports that may form an E-LAN service on the working and protection facilities. The NIDs 706 may be physically connected to the L2 cards 702a, 702b or to another L2 card that is in a network with the L2 cards 702a, 702b. The L2 card 702a includes the SFP facility 710 and the L2 card 702b includes the SFP facility 712 with both of the SFP facilities 710, 712 as UNI ports, and optionally SFP+ compliant devices. The SFP facility 710 is provisioned as the working port and the SFP facility 712 is provisioned as the protection port. As described herein, the facilities 710, 712 are configured to hand-off the E-LAN service to the router 704 in a protected fashion. The router 704a includes the 10 GE port and the router 704b includes the LOGE port 722, and the ports 720, 722 receive the facilities 710, 712, respectively. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one L2 E-LAN (multipoint to multipoint) provisioned thereon. Also, management traffic may be forwarded to NIDs 706 via the GE ports configured as E-NNI with a different secondary provider tag L2 E-LAN Service (different from the data provider tag).

Figure 13:
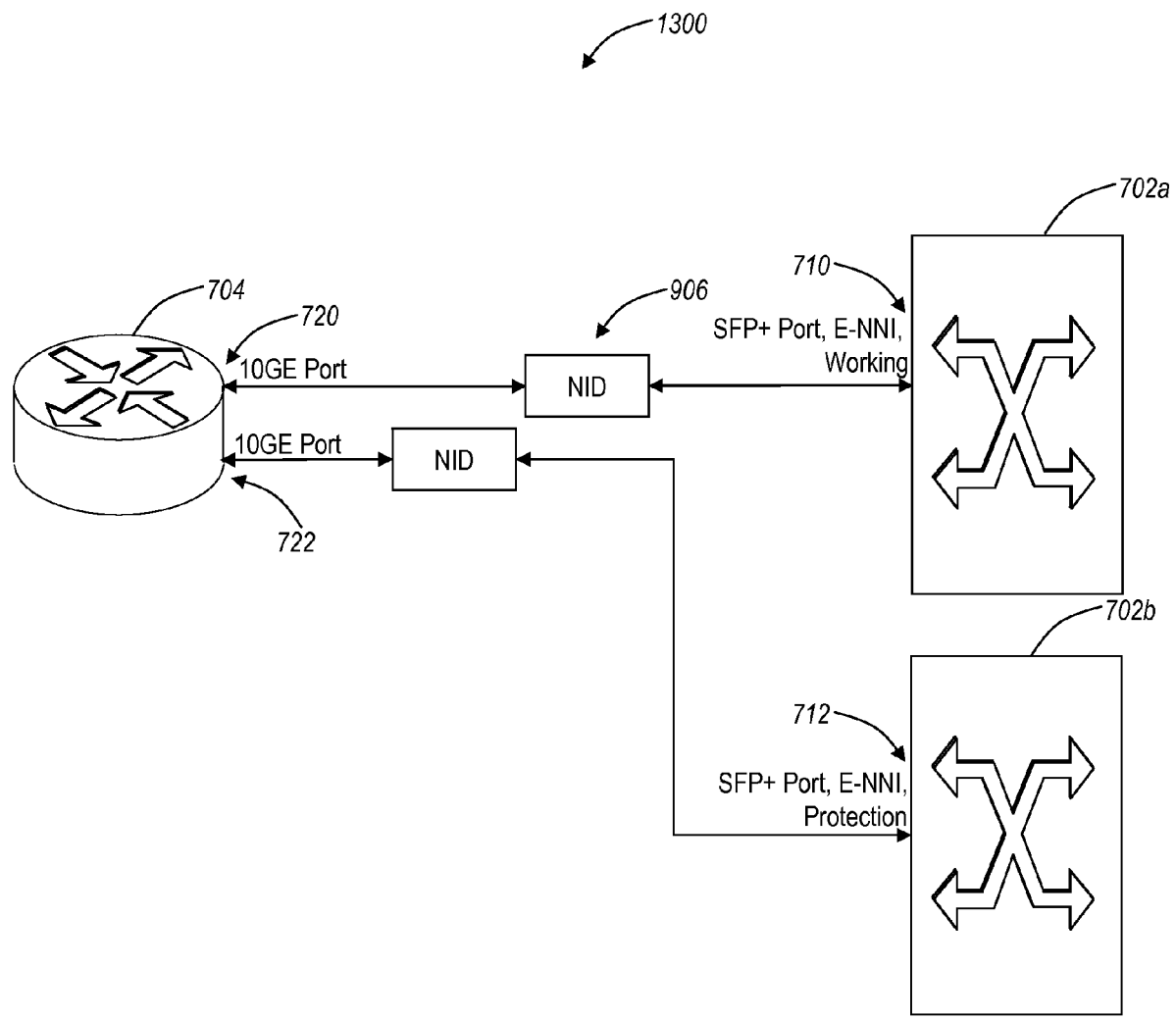
FIG. 13 is a seventh exemplary configuration between two L2 cards and a router with working and protection facilities on the separate L2 cards and on the same router and with intermediate NIDs between the L2 cards and the router.

FIG. 13 illustrates a seventh configuration 1300 between two L2 cards 702a, 702b and the router 704 with working and protection facilities on the separate L2 cards 702a, 702b and on the same router 704 and with intermediate NIDs 902 between the L2 cards 702a, 702b and the router 704. In this configuration 1300, the L2 card 702a includes the SFP facility 710 and the L2 card 702b includes the SFP facility 712. Both of the facilities 710, 712 are E-NNI ports, and optionally SFP+ compliant devices, with the SFP facility 710 provisioned as the working port and the SFP facility 712 provisioned as the protection port. As described herein, the facilities 710, 712 are configured to hand-off an E-LAN service to the router 704 in a protected fashion. The router 704 includes the LOGE ports 720, 722 receiving the facilities 710, 712, respectively. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one or more L2 E-LAN (multipoint to multipoint) provisioned thereon with traffic forwarding using a Provider VID. Also, management traffic may be forwarded to the E-NNI ports with a different secondary provider tag (different from the data P-TAG). Further, the SFP facilities 710, 712 and the ports 720, 722 have NIDs 902 disposed intermediately in each path. The NIDs 902 have port state mirroring enable for link state forwarding between the SFP facilities 710, 712 and the ports 720, 722.

Figure 14:
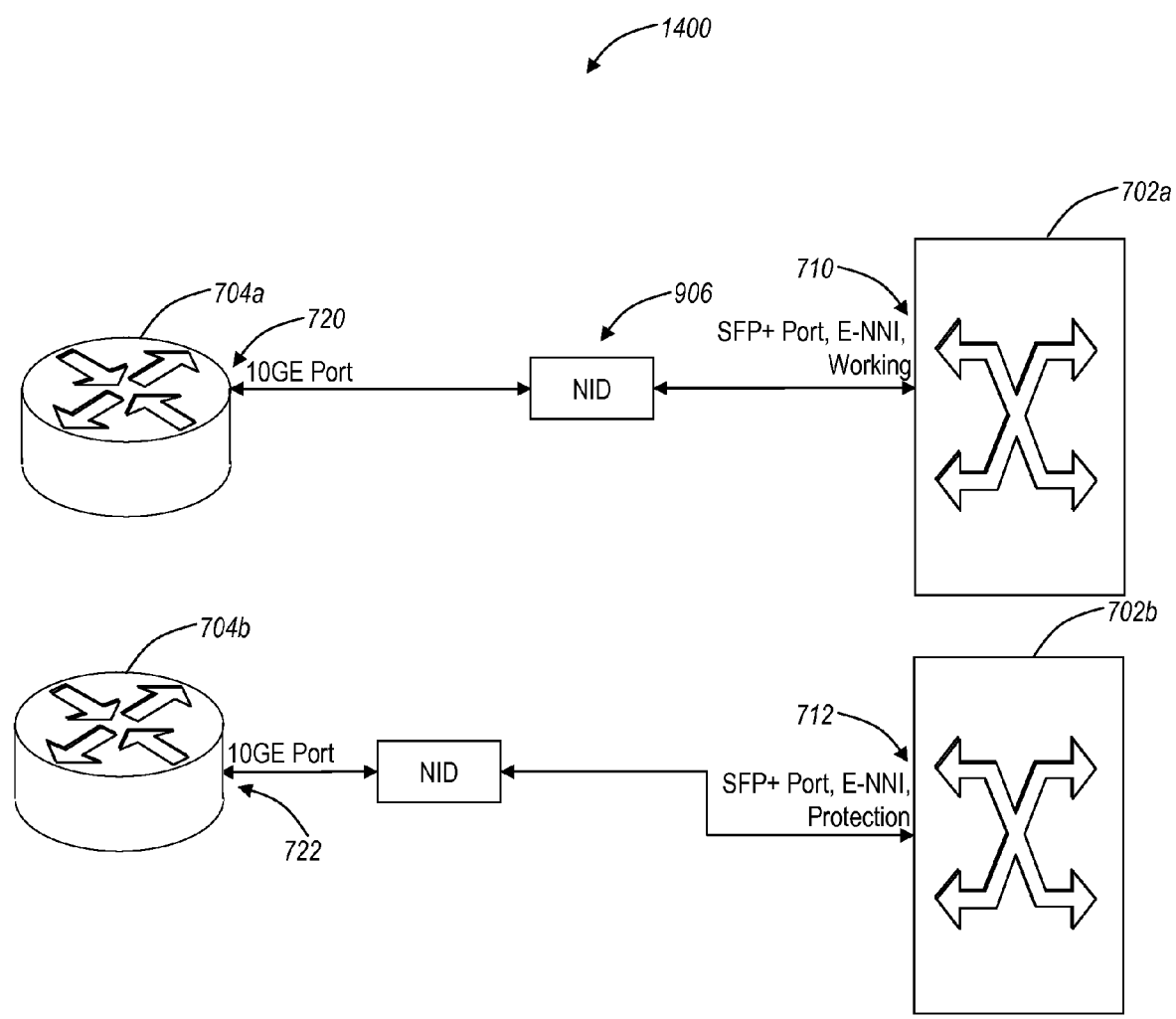
FIG. 14 is an eight exemplary configuration between two L2 cards and between two routers with working and protection facilities on the separate L2 cards and on the separate routers and with intermediate NIDs between the L2 cards and the routers.

FIG. 14 illustrates an eight configuration 1400 between two L2 cards 702a, 702b and between two routers 704a, 704b with working and protection facilities on the separate L2 cards 702a, 702b and on the separate routers 704a, 704b and with intermediate NIDs 902 between the L2 cards 702a, 702b and the routers 704a, 704b. In this configuration 1400, the L2 card 702a includes the SFP facility 710 and the L2 card 702b includes the SFP facility 712. Both of the facilities 710, 712 are E-NNI ports, and optionally SFP+compliant devices, with the SFP facility 710 provisioned as the working port and the SFP facility 712 provisioned as the protection port. As described herein, the facilities 710, 712 are configured to hand-off an E-LAN service to the routers 704a, 704b in a protected fashion. The router 704a includes the 10 GE port 720 and the router 704b includes the LOGE port 722 with the ports 720, 722 receiving the facilities 710, 712, respectively. In normal conditions, traffic is sent between the facility 710 and the port 720 with conditioning between the facility 712 and the port 722. In a failure scenario, traffic is rerouted to the facility 712 and the port 722 with the conditioning on the facility 710 and the port 720. Note, each of the ports 720, 722 and the facilities 710, 712 may include one or more L2 E-LAN (multipoint to multipoint) provisioned thereon with traffic forwarding using a Provider VID. Also, management traffic may be forwarded to the E-NNI ports with a different secondary provider tag (different from the data P-TAG). Further, the SFP facilities 710, 712 and the ports 720, 722 have NIDs 902 disposed intermediately in each path. The NIDs 902 have port state mirroring enable for link state forwarding between the SFP facilities 710, 712 and the ports 720, 722.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method, comprising:
    operating an Ethernet local area network service over a plurality of network elements;
    providing a pair of Ethernet facilities to subtending equipment, the pair of Ethernet facilities comprising a working facility and a protection facility;
    forwarding traffic over the working facility thereby using the working facility as active;
    conditioning the protection facility thereby using the protection facility as standby while the working facility is operating normally, wherein the conditioning comprises continuously transmitting a condition remote fault to subtending equipment on the protection facility in the absence of any fault on the protection facility such that the standby is provisioned, ready to switch to active, and no silent failures occur;
    responsive to detecting a fault on the working facility, forwarding traffic over the protection facility by ceasing the conditioning of the protection facility responsive to a condition comprising RF or Laser Off; and
    responsive to detecting the fault, transmitting ITU Y.1731 Alarm Indication Signal frames between the plurality of network elements, removing the conditioning from the protection facility thereby using the protection facility as active, conditioning the working facility thereby using the working facility as standby, flushing forwarding databases on the plurality of network elements to relearn, reestablishing media access control forwarding over the protection facility, and periodically retransmitting the ITU Y.1731 Alarm Indication Signal frames between the plurality of network elements while the fault remains.

2. The method of claim 1, further comprising:
    signaling status between the pair of Ethernet facilities using ITU Y. 1731 control frames.

3. The method of claim 1, wherein conditioning comprises transmitting a condition Remote Fault or Laser Off.

4. The method of claim 1, further comprising:
    utilizing ITU Y. 1731 Continuity Check Messages between the plurality of network elements and the subtending equipment to detect the fault;
    responsive to detecting the fault, removing the conditioning from the protection facility thereby using the protection facility as active and conditioning the working facility thereby using the working facility as standby; and
    responsive to detecting the fault, transmitting a G.8032 Ring—Automatic Protection Switching message between the plurality of network elements and the subtending equipment to require a flush of forwarding databases such that traffic is relearned on the protection facility.

5. The method of claim 4, wherein the providing a pair of Ethernet facilities to subtending equipment is performed by a single layer two device.

6. The method of claim 5, wherein the subtending equipment comprises a first layer two device receiving the working facility and a second layer two device receiving the protection facility.

7. The method of claim 5, wherein the subtending equipment and the single layer two device have one or more layer two terminating devices disposed intermediately between them, the one or more layer two terminating devices are configured with port state mirroring enable for link state forwarding.

8. The method of claim 4, wherein the providing a pair of Ethernet facilities to subtending equipment is performed by a first layer two device providing the working facility and a second layer two device providing the protection facility.

9. The method of claim 8, wherein the subtending equipment comprises a first layer two device receiving the working facility and a second layer two device receiving the protection facility.

10. The method of claim 8, wherein the subtending equipment and the first layer two device and the subtending equipment and the second layer two device have one or more layer two terminating devices disposed intermediately between them, the one or more layer two terminating devices are configured with port state mirroring enable for link state forwarding.

11. The method of claim 1, wherein the subtending equipment does not support Link Aggregation Control Protocol.

12. A network, comprising:
   a plurality of interconnected layer two network elements forwarding packets therebetween;
   an Ethernet local area network service on the plurality of interconnected layer two network elements; and
   a protected pair of ports comprising a working facility and a protection facility, wherein the protected pair of ports providing the Ethernet local area network service to subtending equipment, wherein the protection facility continuously transmits a condition remote fault to subtending equipment in the absence of any fault on the protection facility while the working facility is operating normally such that the protection facility is provisioned, ready to switch to active, and no silent failures occur;
   wherein ITU Y.1731 Continuity Check Messages are exchanged between the plurality of layer two network elements and the subtending equipment to detect a fault on the working port, and upon detection of the fault, the protection facility removes the condition Remote Fault and, responsive to a condition comprising RF or Laser Off, G.8032 Ring—Automatic Protection Switching messages are exchanged between the plurality of network elements and the subtending equipment to require a flush of forwarding databases such that traffic is relearned on the protection facility; and
   wherein, responsive to detecting the fault, ITU Y.1731 Alarm Indication Signal frames are transmitted between the plurality of network elements, the conditioning from the protection facility is removed thereby using the protection facility as active, the working facility is conditioned thereby using the working facility as standby, forwarding databases on the plurality of network elements are flushed to relearn, media access control forwarding is reestablished over the protection facility, and the ITU Y.1731 Alarm Indication Signal frames are periodically retransmitted between the plurality of network elements while the fault remains.

13. The network of claim 12, wherein the protected pair of ports to subtending equipment is performed by a single layer two network element.

14. The network of claim 13, wherein the subtending equipment comprises a first layer two device receiving the working facility and a second layer two device receiving the protection facility.

15. The network of claim 12, wherein the protected pair of ports to subtending equipment is performed by a first layer two device providing the working facility and a second layer two device providing the protection facility.

16. The network of claim 15, wherein the protected pair of ports to subtending equipment comprises a first layer two network element receiving the working facility and a second layer two network element receiving the protection facility.

17. A method, comprising:
   provisioning a working facility for a layer two service between a first set of equipment and a second set of equipment;
   provisioning a protection facility for the layer two service between the first set of equipment and the second set of equipment;
   forwarding traffic over the working facility;
   continuously transmitting a condition remote fault over the protection facility in the absence of any fault on the protection facility while the working facility is operating normally such that the protection facility is provisioned, ready to switch to active, and no silent failures occur;
   utilizing ITU Y.1731 Continuity Check Messages to detect a fault;
   responsive to detecting the fault and responsive to a condition comprising RF or Laser Off, removing the condition (Remote Fault) from the protection facility and transmitting a condition (Remote Fault) to the working facility;
   responsive to detecting the fault and responsive to the condition comprising RF or Laser Off, transmitting a G.8032 Ring—Automatic Protection Switching message to require a flush of forwarding databases such that traffic is relearned on the protection facility; and
   responsive to detecting the fault, transmitting ITU Y.1731 Alarm Indication Signal frames between the plurality of network elements, removing the conditioning from the protection facility thereby using the protection facility as active, conditioning the working facility thereby using the working facility as standby, flushing forwarding databases on the plurality of network elements to relearn, reestablishing media access control forwarding over the protection facility, and periodically retransmitting the ITU Y.1731 Alarm Indication Signal frames between the plurality of network elements while the fault remains.

* * * * *